(12) United States Patent
Rafailovich et al.

(10) Patent No.: US 8,728,578 B2
(45) Date of Patent: May 20, 2014

(54) CHEMICAL SYNTHESIS FOR GRAPHENE SHEETS GREATER THAN 1 μM IN LENGTH

(75) Inventors: Miriam Rafailovich, Plainview, NY (US); Rebecca Isseroff, West Hempstead, NY (US); Paul Masih Das, Lawrence, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 0 days.

(21) Appl. No.: 13/106,498

(22) Filed: May 12, 2011

(65) Prior Publication Data

US 2011/0281035 A1 Nov. 17, 2011

Related U.S. Application Data

(60) Provisional application No. 61/334,372, filed on May 13, 2010.

(51) Int. Cl.
*B05D 3/02* (2006.01)

(52) U.S. Cl.
USPC ........................................ 427/331; 427/372.2

(58) Field of Classification Search
USPC ................................ 252/511; 427/331, 372.2
See application file for complete search history.

(56) References Cited

PUBLICATIONS

Stankovich et al., 2007, Carbon, 45, 1558-1565.*
Zhang et al., 2010, ACS Nano, 4, 380-386.*
Shin et al., 2009, Adv. Funct. Mater., 19, 1987-1992.*
Si et al., 2008, Nano Lett., 8, 1679-1682.*
Stankovich et al. Carbon 45 (2007) 1558-1565.*
Wang et al. J. Phys. Chem. C. 2008, 112, 8192-8195.*
Shin et al., Adv. Funct. Mater. 2009, 19, 1987-1992.*
Si et al., Nano Lett., 2008, 8, 1679-1682.*
Bourlinos et al., Langmuir 2003, 19, 6050-6055.*
Tung et al. Nature Nanotechnology 2009, vol. 4 25-29.*

* cited by examiner

*Primary Examiner* — Michael Wieczorek
*Assistant Examiner* — Sarah R Anderson
(74) *Attorney, Agent, or Firm* — Hoffmann & Baron, LLP

(57) ABSTRACT

A method for preparing a graphene sheet greater than 1 μm in length that includes: combining graphitic oxide with a solvent having a ratio of from about 50:50 to about 80:20 deionized water and ethanol to form a graphitic oxide solution; mixing a solution of NaBH$_4$ and deionized water and the graphitic oxide solution to form a mixture having a concentration of from 10 mmolar to 20 mmolar NaBH$_4$; depositing the mixture on a substrate to form a sheet; and heating the mixture at a temperature of from 25° C. to 85° C. for from 3 to 30 minutes.

19 Claims, 17 Drawing Sheets

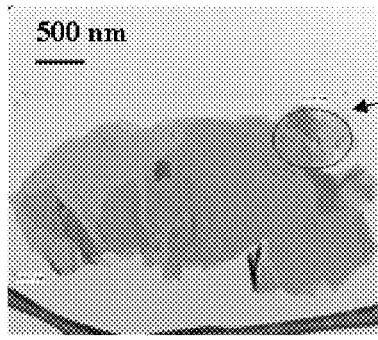 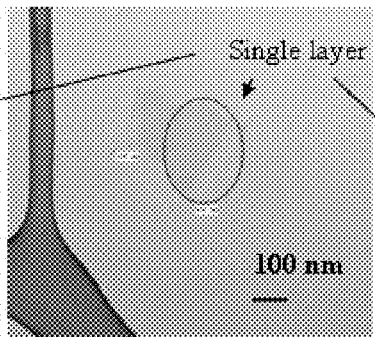 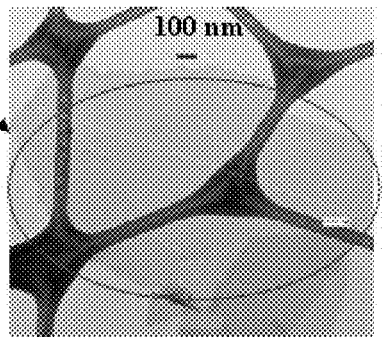
FIG. 30  FIG. 31  FIG. 32
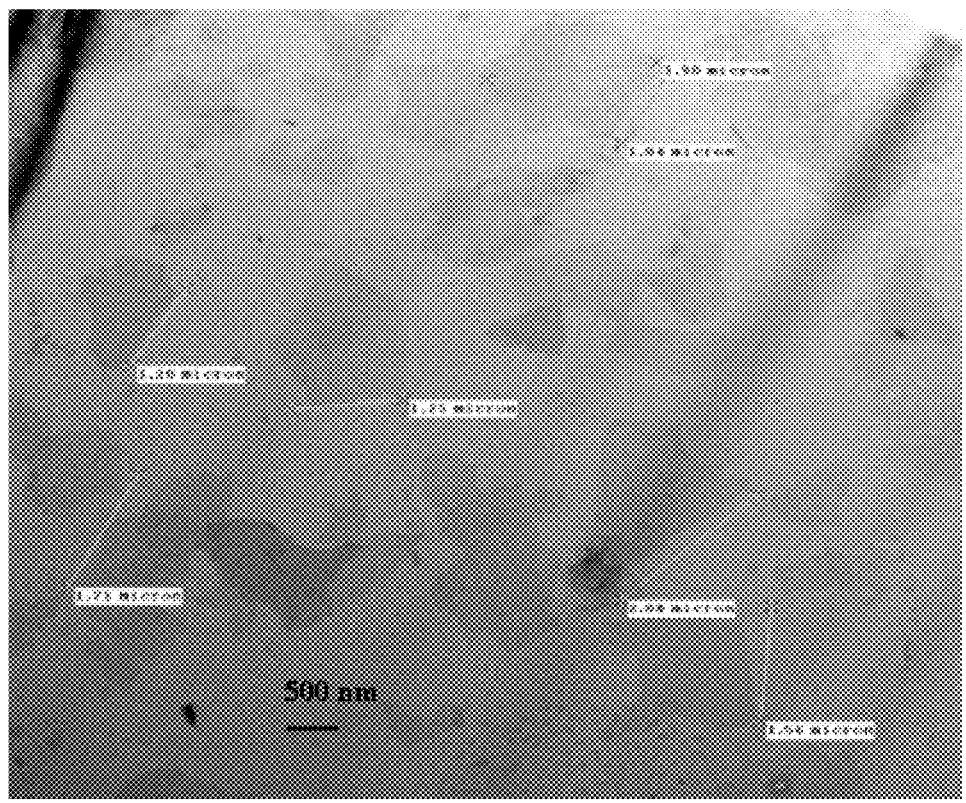
FIG. 33

CHEMICAL SYNTHESIS FOR GRAPHENE SHEETS GREATER THAN 1 µM IN LENGTH

This application claims priority based on provisional application Ser. No. 61/334,372, filed on May 13, 2010, which is incorporated herein by reference in its entirety.

FIELD OF THE INVENTION

The present invention is a method for preparing graphene sheets. In particular, the invention is a method for preparing pure, flat graphene sheets with a length greater than 1 µm.

BACKGROUND OF INVENTION

Graphene is a single layer of carbon atoms that is the subject of much interest because of its extraordinary electronic and mechanical properties. However, previous methods of synthesis have produced graphene sheets that are either less than 400 nm in length or are multi-layered, wrinkled or crumpled.

First synthesized by mechanical exfoliation in 2004 by Andre Geim and Kostva Novoselov of the University of Manchester, graphene is a 2-dimensional sheet of carbon atoms (~38 per nm$^2$) bonded in a hexagonal lattice structure. FIG. 1 is a computer-generated model of graphene. Electron motion is only defined in two directions in graphene, meaning it essentially lacks height and is, therefore, 2-dimensional. In its pristine form, graphene is only one atom high with a Van Der Waals' thickness of 0.34 nm. However, due to standard atmospheric wave oscillations and the Mermin-Wagner Theorem, which states that fluctuation in 2-dimensional materials must exist because they favor an increase in entropy, its ideal height becomes 1 nm (±0.3 nm). Graphene's two-dimensional structure gives it mechanical and electrical properties that exceed those of almost all 3-dimensional solid state and some 2-dimensional electron gases.

The theory of monatomic sheets of carbon was developed in 1947 by Phillip Wallace, who claimed that simpler, 2-dimensional objects could display exemplary electronic properties. Because electrons can only travel in two dimensions in graphene, they spend less time "turning corners" and face less resistance from the internal lattice structure. In fact, graphene has the highest electron mobility rating at 15,000 cm$^2$ V$^{-1}$ s$^{-1}$ and the lowest electron resistivity ever recorded at $1 \times 10^{-9}$ Ωm. Pristine graphene's electrical and thermal conductivities are also reported to be 6 S cm$^{-1}$ and 5,020 W m$^{-1}$ K$^{-1}$ at room temperature, respectively, both of which are almost ten times higher than the respective electrical and thermal conductivities of silver. Graphene's mechanical properties are also exceptional. Its tensile strength of 400,000 MPa is the highest ever recorded. Its surface area of 2,600 m$^2$/g is also exceptionally high.

As of now, graphene's electrical properties, which are far superior to silicon's, make it highly desirable for use in electronic transistors, superconducting switches, and electrochemical supercapacitors. In 2008, researchers from the National University of Singapore tested the contact effects of electrons in graphene transistors. They found that, compared to electrons traveling through other basic metals, electrons traveling through nanoribbons of graphene had little contact with the actual carbon atoms. They also measured the local density of state of graphene. A local density of state measures the number of states, or modes, that are available for varying wavelengths of light to occupy. In short, a local density of state inversely measures the bandgap of a substance, meaning that the smaller the bandgap, the better the conductivity. They found graphene's local density of state to be $12 \times 10^{19}$ n/cm$^3$, which is 4 times larger than that of silicon, indicating exceptional conductivity.

Researchers at the IBM TJ Watson Research Center in New York found the Fermi level, which measures the distance (difference) between the valence and conduction band (states in which electrons can exist) at absolute zero, of graphene to be 0.4 eV. This is quite remarkable, considering that the lowest Fermi level of any basic metal is that of Cesium at 1.59 eV. Electron velocity can also be determined by a combination of Fermi level and microscopic Ohm's law. Presumably, the lower the Fermi level and electron resistivity, the faster the electron velocity. Thus, because it has a low resistivity and Fermi level, electrons must travel extremely fast in graphene. Furthermore, they found that under a 0 V drain bias, graphene has an electron carrier concentration of $1.1 \times 10^{11}$ cm$^{-2}$. Under similar conditions, silicon has a carrier concentration of only $1 \times 10^{10}$ cm$^{-2}$.

There have been many different techniques developed in an attempt to synthesize graphene. Park et al. mechanically cleaved graphite by stamping it with an epoxy-coated TEM grid, but this produced multilayers as well as some single-layered areas. Stankovich et al. treated graphene oxide with organic isocyanides and then made graphene-polymer composites, but not pure graphene. Yang et al. functionalized graphene sheets with 1-(3-aminopropyl)-3-methylimidazolium bromide. Yang's "functionalized graphene" is illustrated in FIG. 2. N. Liu et al. electrochemically functionalized graphite immersed in a solution of water and 1-octyl-3-methyl-imidazolium hexafluoropbosphate. TEM images depicted multi-layered graphene and AFM height profiles of 4 nm sheets in some places, much higher than a monatomic carbon layer.

In 2006, Niyogi et al. refluxed graphene (graphitic or graphite) oxide ("GO") with thionyl chloride and dimethyl-formamide for 24 hours. The oxidized GO was then reacted with octadecylamine for 4 days, filtered and dispersed in tetrandrofuran. Raman spectra (i.e., a spectroscopic technique used to study vibrational, rotational, and other low-frequency modes in a system) demonstrated highly functionalized graphene sheets. Researchers at the Pacific Northwest National Laboratory in Richland, Wash. under Rong Kou synthesized graphene by the rapid thermal expansion to 1200° C. of expandable graphite and found that the resulting sheets were extremely wrinkled, as shown in FIG. 3. Others have also tried this method and obtained similar results. Some even found that after expansion under 1000° C., the graphite did not exfoliate to less than 4 or 5 layers.

Chemical reduction of GO is the method many researchers use as the first step towards graphene synthesis. GO is layered graphene with epoxide and hydroxyl groups on the edges of a 3-dimensional lattice structure, as illustrated in FIG. 4. When GO is reduced, the functional groups on the edges are removed, thus releasing the layered graphene sheets into individual pieces. J. I. Paredes at the National Carbon Institute in Oviedo, Spain synthesized high-quality graphene in 2008. He first used the Hummers method of oxidizing graphite with a mixture of $H_2SO_4$, $KMnO_4$, and $NaNO_3$ to produce GO and then reduced it with a 2:1 ratio of ammonia:hydrazine monohydrate, refluxing for 1 hour. This graphene displayed an ideal thickness of 1 nm and was multi-layered in very few places but had, at most, lengths of 300 nm. Researchers under Dan Li used Paredes' method but substituted a 1:7 solution of hydrazine:ammonia and filtered the suspension after reduction. Li's graphene sheets were also the ideal thickness, but comparatively small (200 nm).

In 2007, under Guoxiu Wang, researchers in Australia synthesized graphene by first forming GO through the Hummers method and reducing it by refluxing with hydroquinone for 20 hours. Their graphene sheets were wrinkled, less than 600 nm in length, and multi-layered. Raman results also suggested that the GO had been reduced not to graphene but back to graphite due to the presence of a graphite peak at 2600 cm$^{-1}$.

Bourlinos et al. made two dispersions of 100 mg of GO in 20 ml water. To one sample, he added 200 mg $NaBH_4$ and heated the mixture in a steam bath for 3 hours, producing graphite. To the other sample, he added 300 mg hydroquinone $C_6H_4(OH)_2$ and refluxed for 20 hours, also producing a graphitic solid. Wang et al. in Australia suspended GO in an unspecified mixture of ethanol and water and then reduced with hydroquinone by refluxing for 20 hours, centrifuging, washing and drying the precipitate. FIG. 5 shows these graphene sheets, which resembled crumpled silk, entangled and rippled with each other. Chen dispersed GO in $H_2O$ and used p-phenylene diamine as a reducing agent, but prepared a chemically modified graphene colloid. Shin et al. dispersed GO in an aqueous solution of NaOH (pH=10) and found that $N_2H_4$ reduction produced films with some C—N groups, which can act as n-type chemical dopants, producing relatively higher sheet resistance. Shin also tested reduction by dipping GO films that were deposited onto PET substrates into $NaBH_4$ at 15, 50, and 150 mmolar concentrations. It was found that a large increase in defects, monitored by the ratio of the D:G band intensities of the Raman spectra, was generated by the 150 mmolar concentration, but that the 15 mmolar $NaBH_4$ did not completely remove all the carbonyl groups.

Thus, prior art methods of GO reduction include using sodium borohydride ($NaBH_4$), hydrazine ($N_2H_4$) or its hydrate form, and hydroquinone ($C_6H_4(OH)_2$) have been unable to create a flat, pure graphene sheet greater than 1 µm long. These processes produce individual graphene sheets, but they are crumpled, wrinkled, cracked, or only 200-300 nm long. A typical example of such sheets is shown in FIG. 6. Accordingly, there is a need for a method to synthesize sizable, flat monolayer graphene sheets without functionalizing them.

SUMMARY OF THE INVENTION

In accordance with the present invention, a method for preparing a graphene sheet greater than 1 µm in length is provided. The method includes: combining graphitic oxide with a solvent that includes ethanol to form a graphitic oxide solution; mixing a reductant and the graphitic oxide solution to form a mixture; depositing the mixture on a substrate, preferably a silicon substrate, to form a sheet; and heating the mixture at a temperature of from 25° C. to 90° C., preferably from 50° C. to 85° C. and more preferably from 75° C. to 85° C., for from 3 to 30 minutes and preferably from 5 to 15 minutes.

The solvent is preferably a mixture of deionized water and ethanol with a volumetric ratio of deionized water to ethanol of from about 50:50 to about 80:20 and preferably from about 65:35 to about 75:25. The concentration of the reductant in the mixture is from 5 mmolar to 25 mmolar, preferably from 10 mmolar to 20 mmolar and most preferably from 13 mmolar to 17 mmolar. Preferably, the reductant is $NaBH_4$ and the $NaBH_4$ is mixed with deionized water to form a solution.

BRIEF DESCRIPTION OF THE FIGURES

The preferred embodiments of the chemical synthesis for graphene sheets of the present invention, as well as other objects, features and advantages of this invention, will be apparent from the accompanying drawings wherein:

FIG. 30 is a TEM image showing graphene on the edges of a sheet formed from graphene reduced in a NaOH suspension.

FIG. 31 is a TEM image showing graphene sheets less than 400 nm in length formed from graphene reduced in a NaOH suspension.

FIG. 32 is a TEM image showing graphene sheets formed from graphene reduced in a 50:50 DI $H_2O$/ethanol suspension.

FIG. 33 is a TEM image showing graphene sheets formed from graphene reduced in a 75:25 DI $H_2O$/ethanol suspension.

DETAILED DESCRIPTION OF THE INVENTION

Figure 1:
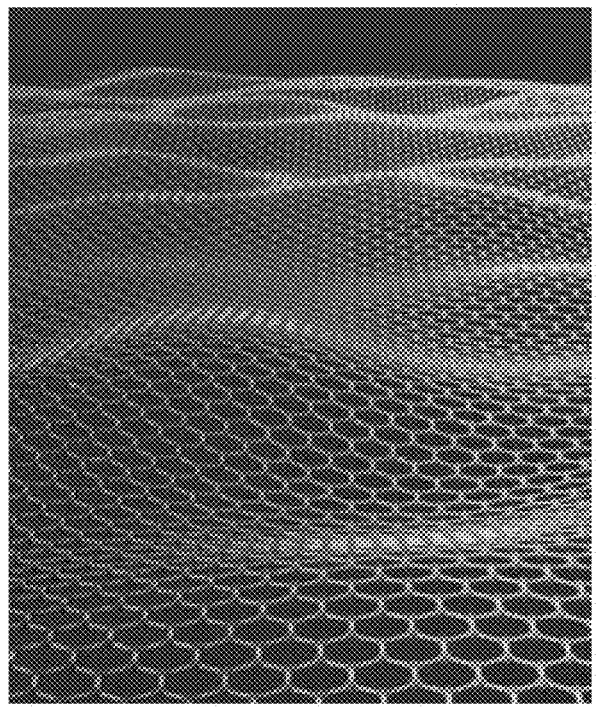
FIG. 1 is a prior art computer-generated model of graphene.
Figure 2:
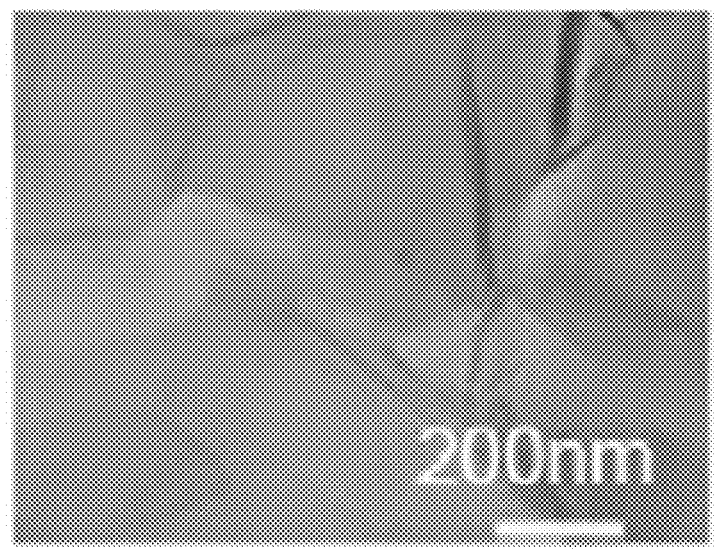
FIG. 2 is a prior art Transmission Electron Microscopy ("TEM") image of functionalized graphene.
Figure 3:
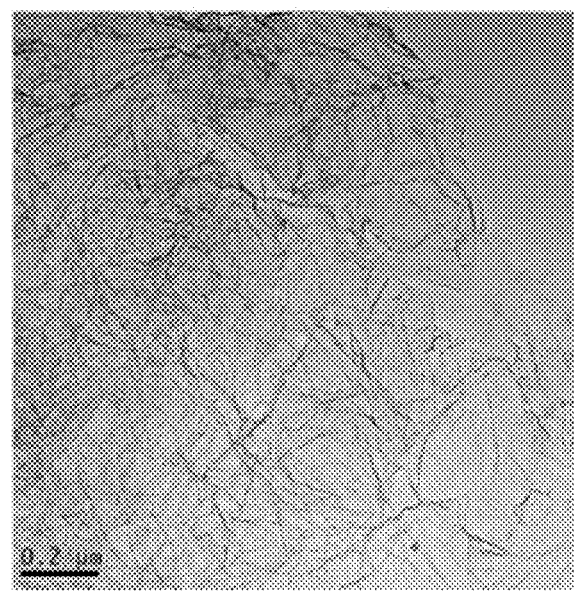
FIG. 3 is a prior art TEM image of synthesized graphene.
Figure 4:
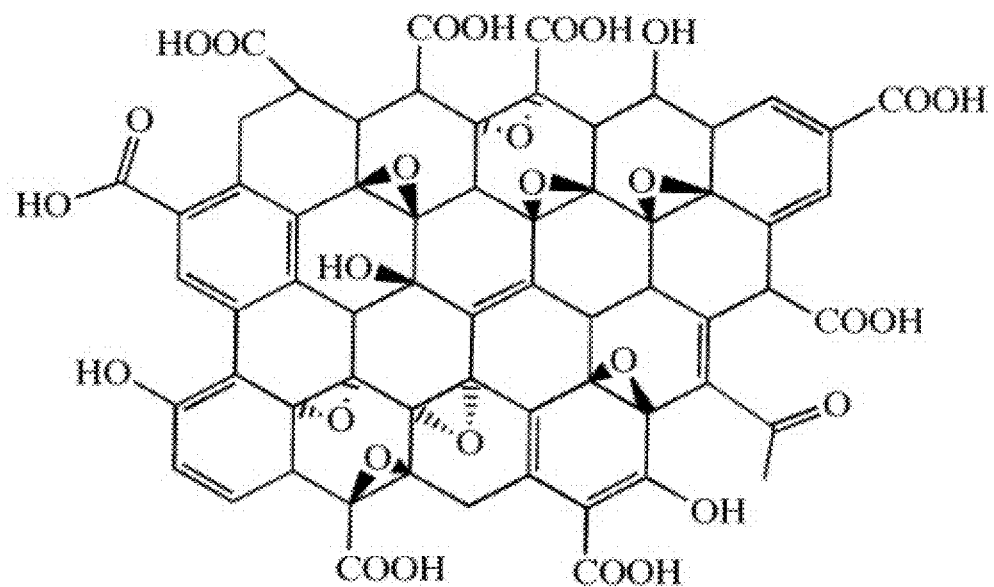
FIG. 4 is a prior art three dimensional lattice structure for graphene.
Figure 5:
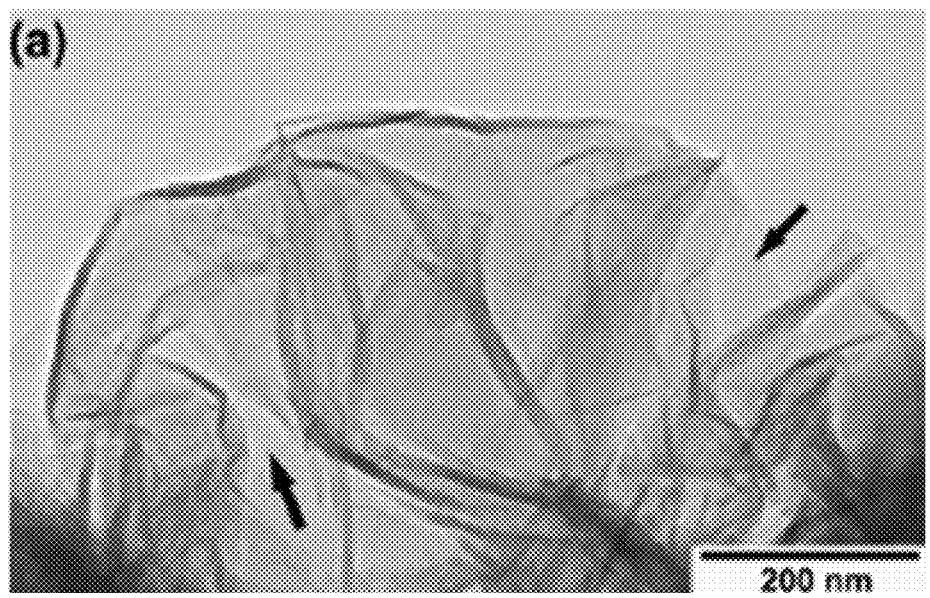
FIG. 5 is a prior art TEM image of an attempt to produce a graphene sheet.
Figure 6:
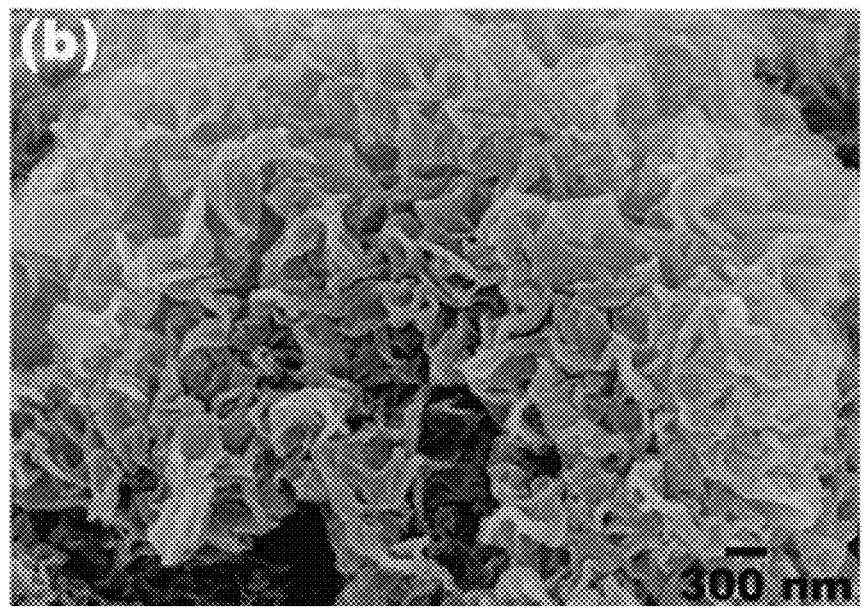
FIG. 6 is a prior art TEM image of an attempt to produce a graphene sheet.

The present invention is a method for preparing pure, flat graphene sheets with a length greater than 1 µm. Previous chemical reduction methods employed refluxing GO with a reducing agent for a minimum of two hours and up to as long as 20 hours, leading to less than optimal results due to the harsh process. The present invention uses milder reduction procedures at lower reductant concentrations to overcome the problems identified in the prior art.

The graphene sheets are prepared by a process that includes: combining graphitic oxide with a solvent to form a graphitic oxide solution; mixing a reductant and the graphitic oxide solution to form a mixture; and depositing the mixture on a silicon substrate to form a sheet. The process of the present invention is conducted at conditions less harsh than heretofore used and, as possible, with use of less reductant. Preferably, the concentration of the reductant in the mixture is less than 15 mmolar.

The solvent mixed with the graphitic oxide preferably includes deionized water and from 20 to 50 percent ethanol. This graphitic oxide solution is then mixed with a reductant to form a mixture. The reductant is preferably a solution of $NaBH_4$ and deionized water. The concentration of the reductant in the mixture can be as high as 25 mmolar, but is preferably less than 15 mmolar. The graphene sheets are then formed by depositing the mixture on a silicon substrate and heating the mixture at a temperature of preferably from 25° C. to 90° C., more preferably from 50° C. to 85° C. and most preferably from 75° C. to 85° C., for from 3 to 30 minutes and preferably from 5 to 15 minutes.

EXAMPLES

The examples set forth below serve to provide further appreciation of the invention but are not meant in any way to restrict the scope of the invention.

Preparation of Samples

Four different solvents were tested for dispersing GO: (1) water, (2) aqueous NaOH (pH=10), (3) 75% $H_2O$/25% ethanol, and (4) 50% $H_2O$/50% ethanol. Each of the four solvents was reduced using a freshly prepared aqueous solution of $NaBH_4$, slowly adding dropwise to each dispersion while stirring, bringing the final concentration of each mixture to 15 mmolar $NaBH_4$. This concentration was chosen because, although Shin found that it did not completely reduce GO films on a PET substrate, this may be because the dried GO films were not completely exposed to the reducing agent. However, Shin found that higher concentrations of $NaBH_4$ produced graphene sheets with more defects. Thus, a lower concentration, added to GO fully dispersed in a solvent and initially stirred at room temperature, may produce larger graphene sheets with fewer defects, similar to the way a slower crystallization process produces a larger and more perfect crystal. Solutions were stirred for 30 minutes at room temperature and then the mixtures were heated to 80° C. for not more than 30 minutes to ensure complete reduction, but by milder conditions. Each product was characterized to determine the graphene content and it was found that reduction in 75% $H_2O$/25% ethanol and 50% $H_2O$/50% ethanol produced graphene sheets greater than 1 micron in length, yet only 1 nm high, showing that monatomic layers were created.

Graphene Oxide Synthesis

GO was synthesized by a modified Hummers method. 2 grams of high-purity powdered graphite (Bay Carbon Inc., 99%, 200 mesh) were added to a battery jar containing 46 mL $H_2SO_{4(aq)}$ (Sigma-Aldrich, 98%) in a dry ice bath, maintaining a temperature below 3.2° C. The black mixture was continuously stirred at 250 rpm on an IKA ETS-D4 stirring hot plate. 1 gram of $NaNO_3$ (Sigma-Aldrich, 99%) and 6 grams of $KMnO_4$ (Sigma-Aldrich, 97%, 325 mesh) were then added to the stirring dark blue mixture, respectively. The GO paste was removed from the ice bath and stirred at room temperature for one hour. During this time, the temperature of the paste rose from 5.0° C. to 35.0° C. 32 mL of deionized ("DI") $H_2O$ were then added to the paste, whose temperature rose to 73.0° C. After 15 minutes, when the temperature of the paste decreased to 52° C., an additional 280 mL DI $H_2O$ were added. 10 mL 30% $H_2O_2$ (JT Baker) were then added to reduce the residual permanganate and manganese dioxide, turning the color of the suspension to dark yellow-green. The suspension was filtered through a Kimble Kontes 60 µm pore size filter funnel. The paste was washed with a total of 280 mL DI $H_2O$ and vacuum-filtered for 16 hours. The dry GO paste was then re-suspended in 70 ml DI $H_2O$ and centrifuged at 3000 RPM for 15 minutes at 10° C. in a Sorvall CR-6 Plus ultracentrifuge, and was washed by this method two more times to remove residual ions. The paste was then washed with 20 ml, 37% hydrochloric acid (Sigma-Aldrich) and 80 mL DI $H_2O$ and vacuum-filtered, then re-suspended in DI $H_2O$ and centrifuged at 3000 RPM for 15 minutes at 10° C. It was washed by this method 6 times to remove residual acid. The GO paste was dried in a vacuum oven at 80° C. with a final yield of 2.77 grams.

Graphene Oxide Reduction 10 mg (±0.01 mg) of GO were added to each of 4 solvent preparations: (a) 10 mL DI $H_2O$; (b) 7.5 mL DI $H_2O$/2.5 mL ethanol (100%); (c) 5.0 mL DI $H_2O$/5.0 mL ethanol; and (d) 10 mL $NaOH_{(aq)}$ (1×10-4 M) and sonicated (Branson 3510) for 1 hour. The suspensions were then centrifuged at 3000 RPM for 10 minutes and the supernatant containing suspended GO sheets retained for reduction. 19.9 mg of $NaBH_4$ (Sigma-Aldrich VenPure AF Granules) was added to 2.0 mL DI $H_2O$. 300 µL of the $NaBH_4$ solution was then slowly added to each of the four stirring mixtures to produce a final $NaBH_4$ concentration of about 15 mmolar. The DI $H_2O$ and $NaOH_{(aq)}$ mixtures (formed from suspensions (a) and (d), respectively) were stirred for 30 minutes at room temperature and heated to 80° C. for 45 minutes. The 50:50 and 75:25 DI $H_2O$/ethanol suspensions (formed from suspensions (c) and (b), respectively) were stirred for 30 minutes at room temperature and heated to 80° C. for only 5 and 15 minutes, respectively, to avoid substantial evaporation of the ethanol.

Sample Analysis Preparation

Raman and Fourier Transform Infrared Spectroscopy (Raman and FTIR)

Raman Spectroscopy (Raman) measures the energies of scattered photons after a laser travels through a sample. Fourier Transform Infrared Spectroscopy ("FTIR") measures the absorption of infrared light as it travels through a substance. Differences in both FTIR and Raman spectra can determine the presence of graphite, GO, and graphene. 250 μL of each suspension was pipetted onto 1 cm$^2$ gold-plated microscope slides and dried in a vacuum oven at 80° C. for 30 minutes. The slides were then analyzed by a Thermo Nicolet Almega Dispersive Raman (785 nm laser) and a Thermo Nicolet Continuum FTIR.

X-Ray Diffraction (XRD)

X-Ray Diffraction ("XRD") measures the intensity of an X-ray beam as it travels through a substance. Graphite, GO, and graphene all scatter X-rays at different source angles, meaning that each of their XRD peaks will be different sizes and at different angles. 1 mL of each suspension (suspensions (a)-(d)) was pipetted onto cleaned and dried microscope slides and then dried in a vacuum oven at 80° C. for 30 minutes. XRD was done using a Scintag XDS-5 X-Ray Diffractor going from 5° to 30° on a 2θ axis at a rate 2.5°/min.

Atomic Force Microscopy (AFM)

Atomic Force Microscopy ("AFM") runs a nano-sized tip across the sample, thereby creating a 3-dimensional image of the surface. AFM can also provide evidence of monatomic layers in each sample by supplying height profiles with a precision of 0.1 nm. 100 μL of each suspension was pipetted onto cleaned 1 cm$^2$ silicon wafers and dried in a vacuum oven at 80° C. for 30 minutes. Samples were analyzed using a Digital Instruments Dimension 3000 Atomic Force Microscope with a 10 nm tip and 1.0 Hz scan rate with two modes: friction mode under a 0.50 V Z range, and contact mode under a 10 nm Z range.

Thermogravimetric Analysis (TGA)

Thermogravimetric Analysis ("TGA") measures the weight loss of a substance as it is heated. TGA determines the decomposition temperatures of graphite, GO, and graphene—all of which are different. 500 μL of each suspension (suspensions (a)-(d)) was added to a cleaned and dried 1 cm$^3$ clay crucible and dried in a vacuum oven at 80° C. for 30 minutes. The weight of each sample was approximately 0.05 mg (±0.01 mg). Each sample was heated to 200° C. above its assumed decomposition temperature at a rate of 12° C./minute using a Mettler Toledo TGA/SDTA851. During the analysis, the chamber was continually purged with $N_{2(g)}$. After each analysis, the crucible was washed and dried again.

Transmission Electron Microscopy (TEM), High-Resolution Transmission Electron Microscopy (HRTEM), and Electron Diffraction (ED)

Transmission Electron Microscopy ("TEM") images a substance by shining an electron beam through it. High-Resolution Transmission Electron Microscopy ("HRTEM") is a more accurate form of TEM that allows imaging at the atomic scale. Electron Diffraction ("ED") uses an electron beam to determine the crystalline structure of a given substance. By analyzing TEM and HRTEM images and ED patterns, the size and number of layers of each sheet can be determined. 10 μL of each suspension (suspensions (a)-(d)) was pipetted onto TEM grids and allowed to dry at room temperature for 2 hours. Small GO sheets were put directly onto grids and imaged. Samples were analyzed using a TECNAI G$^2$ TEM under an 80 kV tension.

Changes During GO Reduction

Figure 7:
FIG. 7 shows unreduced GO suspensions for $H_2O$; 75:25 DI $H_2O$/ethanol; 50:50 DI $H_2O$/ethanol; and $NaOH_{(aq)}$.
Figure 8:
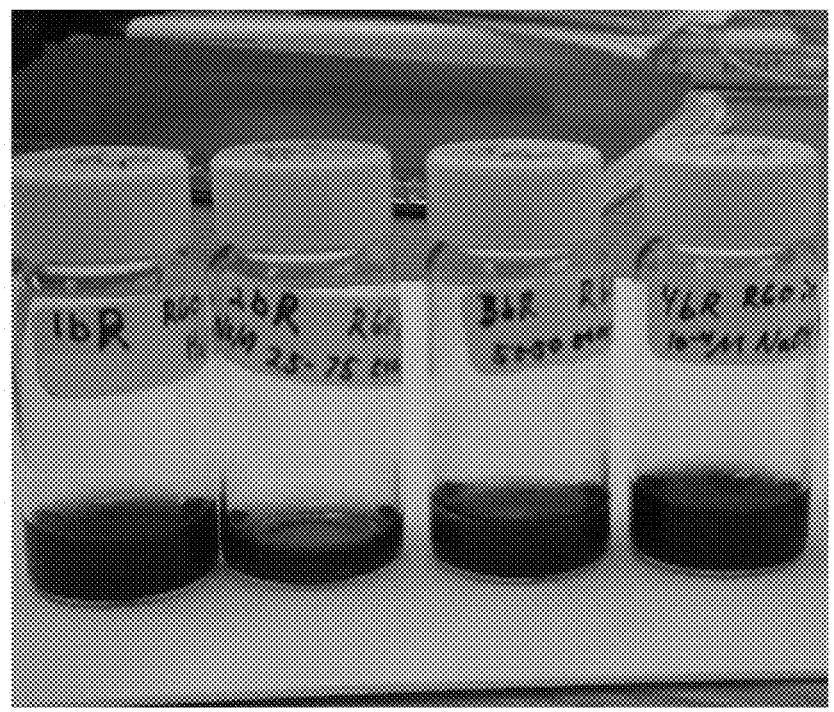
FIG. 8 reduced GO suspensions for $H_2O$; 75:25 DI $H_2O$/ethanol; 50:50 DI $H_2O$/ethanol; and $NaOH_{(aq)}$.
Figure 9:
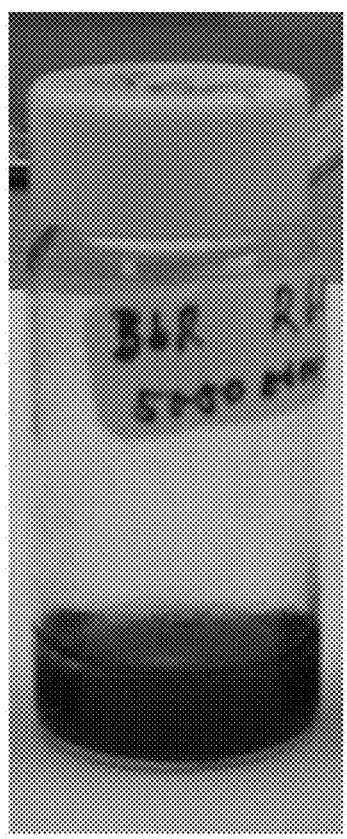
FIG. 9 shows the 50:50 DI $H_2O$/ethanol suspension after 3 minutes of adding $NaBH_4$.

During GO reduction, the color of the suspensions (suspensions (a)-(d)) became visibly darker. FIG. 7 shows the lighter, unreduced GO suspensions and FIG. 8 shows the darker, reduced GO suspensions. This is most likely because of the disappearance of multi-layered GO and the appearance of single-layered graphene, which has a dark, graphite-like color in suspension. FIG. 9 shows that after 3 minutes of adding the $NaBH_4$, an observable dark-brown precipitate formed in the 50:50 suspension (suspension (c)), but not in any of the other solvents.

Raman Spectroscopy (Raman)

Figure 10:
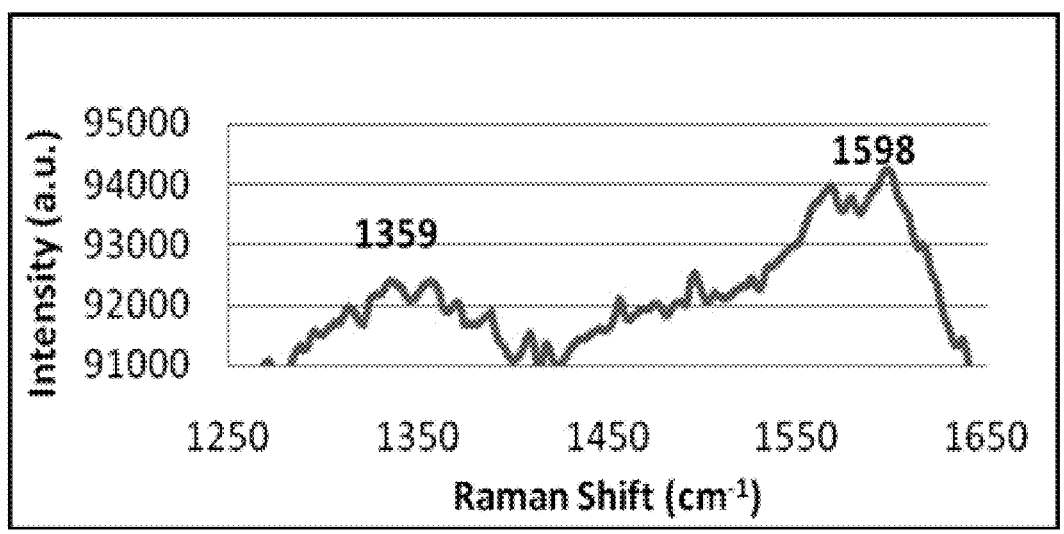
FIG. 10 is the Raman spectra for graphite.
Figure 11:
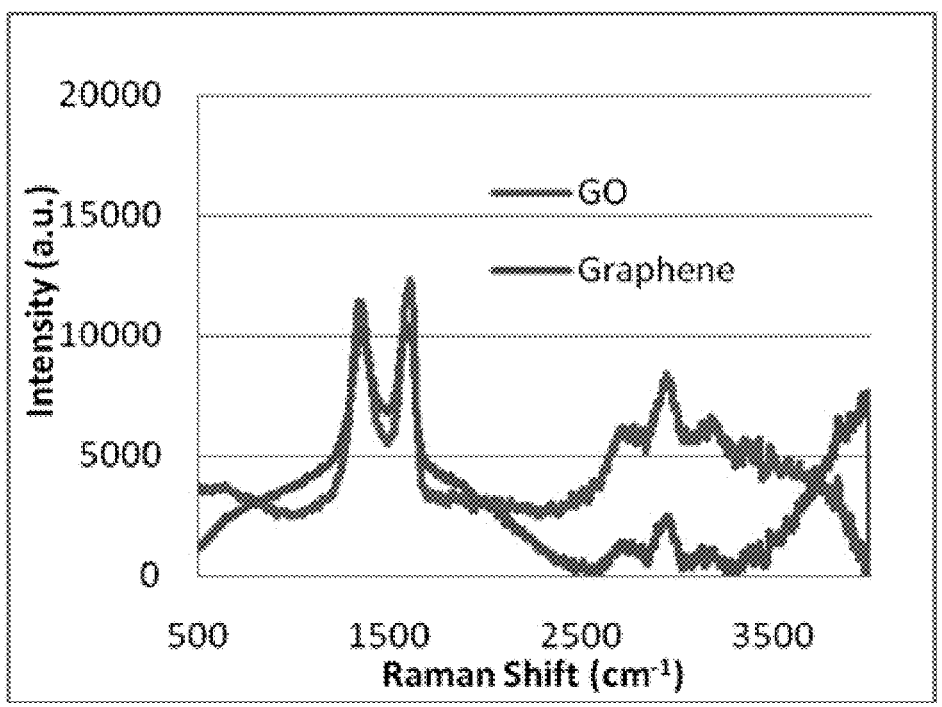
FIG. 11 is the Raman spectra for the reduced graphene oxide in the $H_2O$ suspension.
Figure 12:
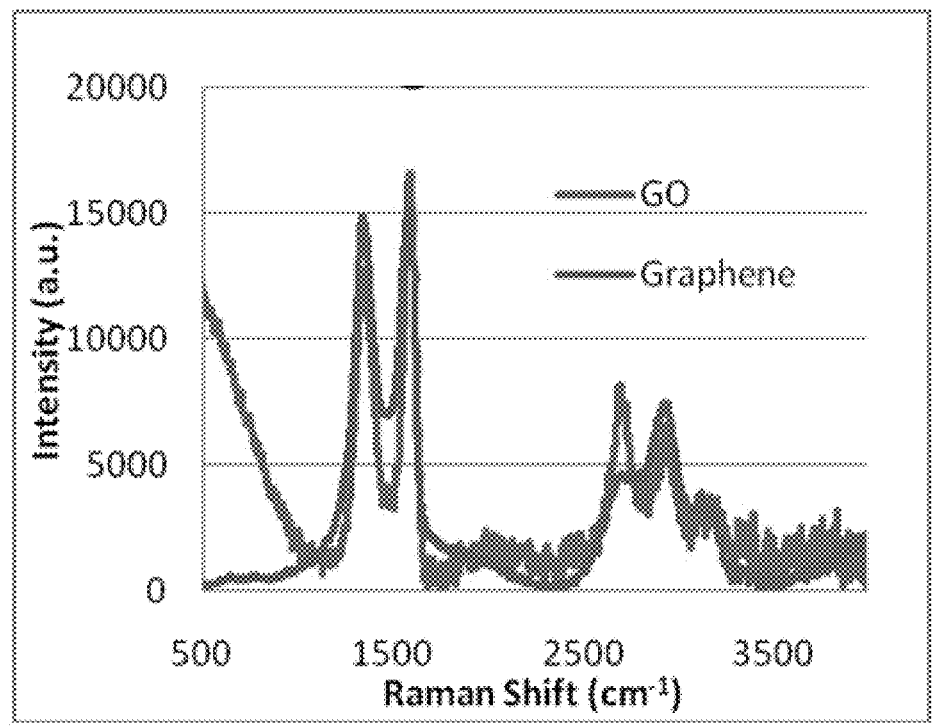
FIG. 12 is the Raman spectra for the reduced graphene oxide in a 75:25 DI $H_2O$/ethanol suspension.
Figure 13:
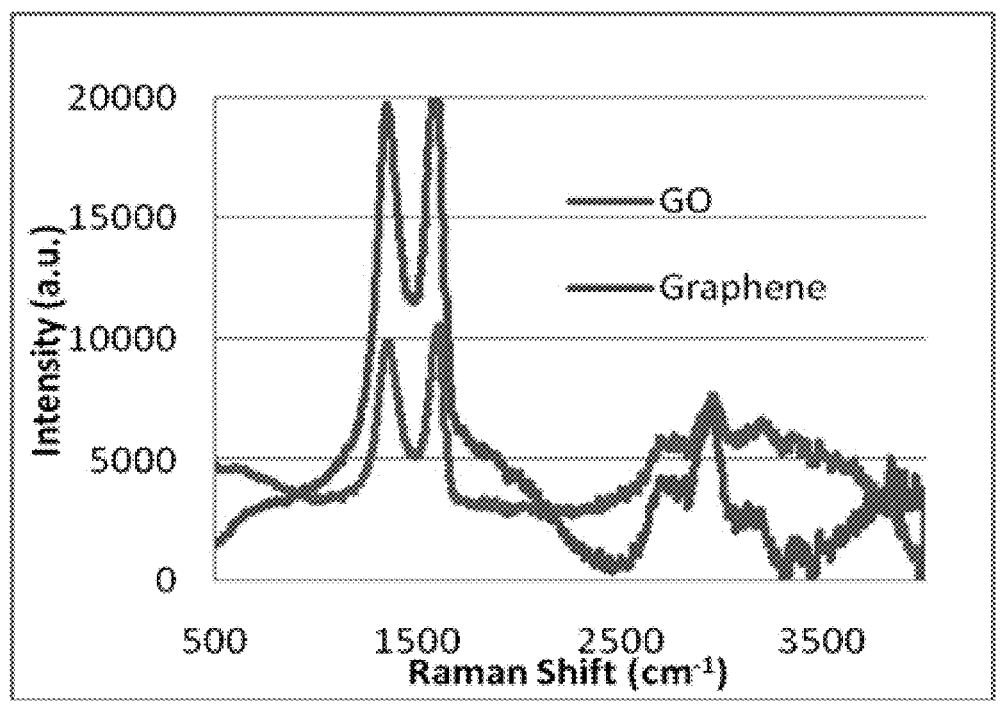
FIG. 13 is the Raman spectra for the reduced graphene oxide in a 50:50 DI $H_2O$/ethanol suspension.
Figure 14:
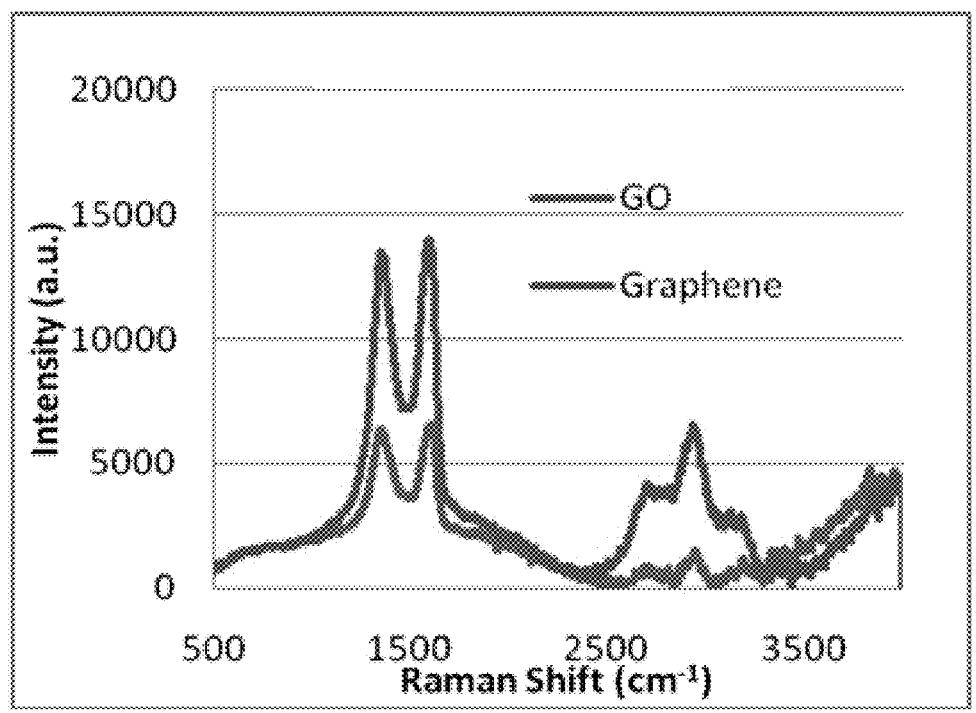
FIG. 14 is the Raman spectra for the reduced graphene oxide in the NaOH suspension.

The Raman spectra of graphite should show D and G peaks at 1360 cm$^{-1}$ and 1600 cm$^{-1}$, respectively. The graphite D peak should also be lower than the G peak. Both of these aspects were present in the graphite Raman spectrum shown in FIG. 10. According to Paredes, GO Raman results should demonstrate two peaks at 1350 cm$^{-1}$ and 1600 cm$^{-1}$ with the 1350 cm$^{-1}$ D peak being only slightly lower. Both of these characteristics were seen when GO was analyzed (FIGS. 11-14). According to Gomez-Navarro, the Raman results should illustrate two peaks that are more level with each other than in GO, for graphene: one D peak at 1350 cm$^{-1}$ and a slightly smaller or equal G peak at 1600 cm$^{-1}$. FIGS. 11-13 show that this was present in the $H_2O$, 75:25, and 50:50 samples (i.e., suspensions (a)-(c) respectively), but not in the NaOH sample (suspension (d)) results shown in FIG. 14. The most apparent evidence that the GO has been reduced is seen when peaks in the 2500 to 3500 cm$^{-1}$ range are diminished. This was present in all the samples except NaOH (FIG. 14).

Fourier Transform Infrared Spectroscopy (FTIR)

Figure 15:
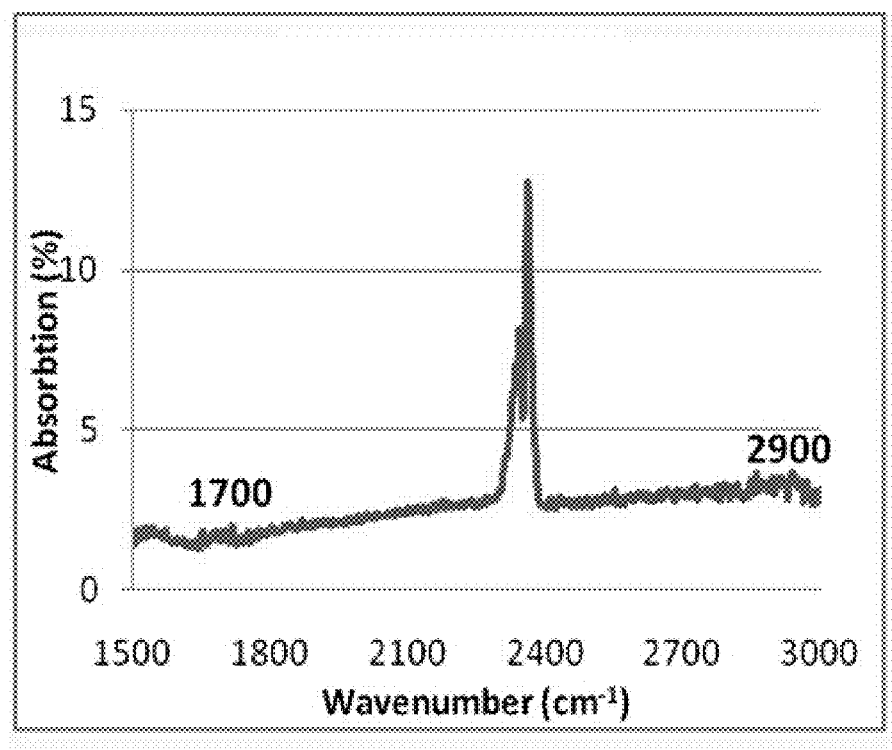
FIG. 15 is the Fourier Transform Infrared Spectroscopy Spectra of graphene oxide.
Figure 16:
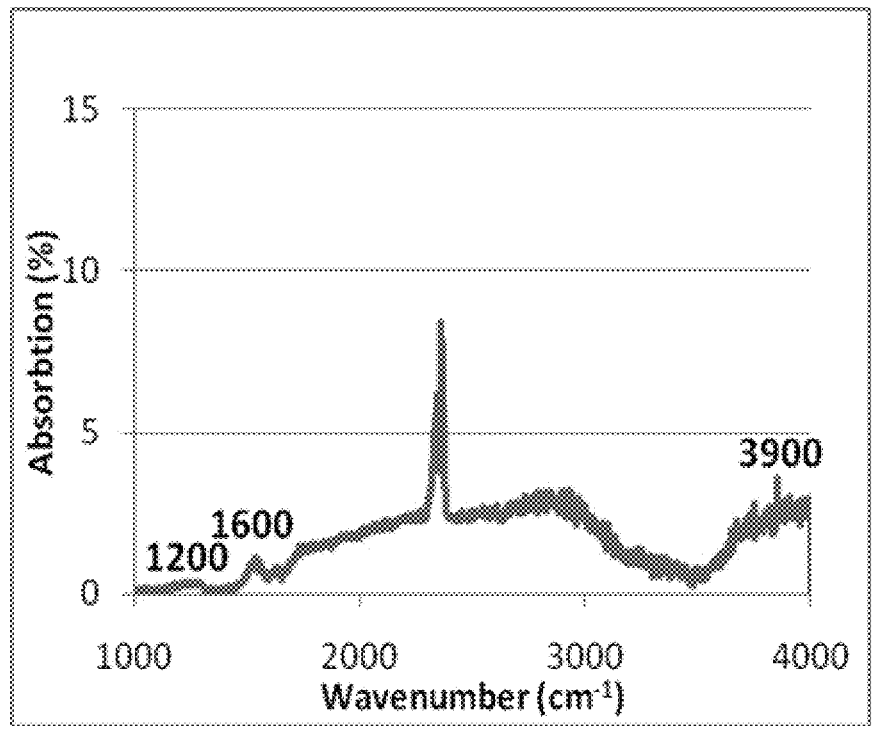
FIG. 16 is the Fourier Transform Infrared Spectroscopy Spectra of graphene reduced in a 75:25 DI $H_2O$/ethanol suspension.
Figure 17:
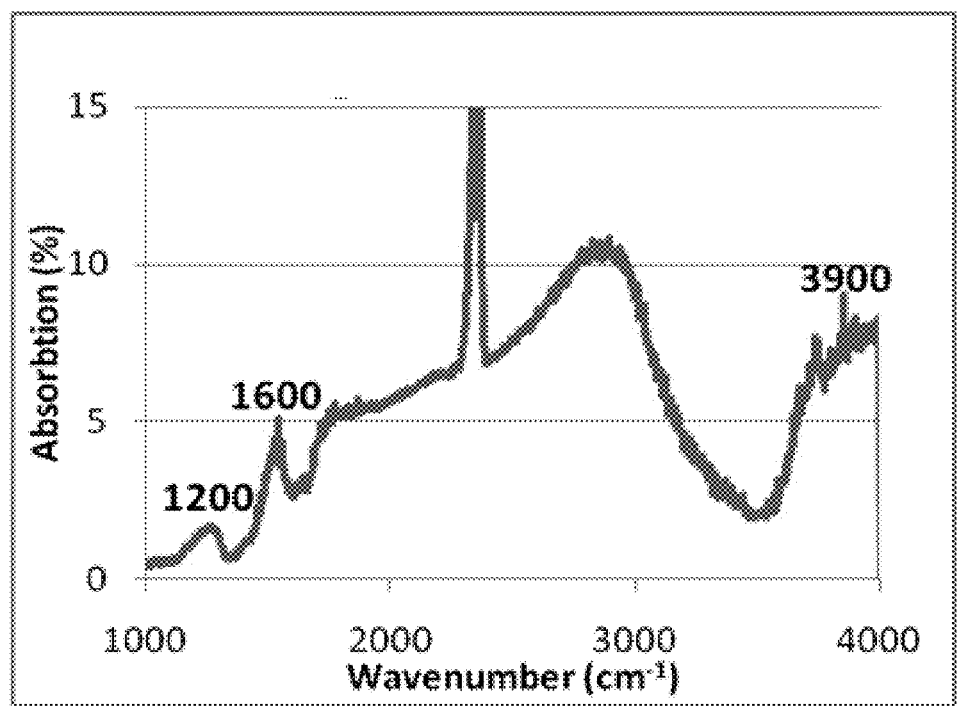
FIG. 17 is the Fourier Transform Infrared Spectroscopy Spectra of graphene reduced in a 50:50 DI $H_2O$/ethanol suspension.

According to Li, the FTIR Spectra of GO shows peaks, due to C—O—C and C=O bonds, at 1600, 1700, and 2900 cm$^{-1}$, which were found in the GO sample (FIG. 15). Li further discloses that the FTIR spectra of graphene should also show peaks, because of C—C bonds, at 1200 and 1600 cm$^{-1}$ and a distortion at 3900 cm$^{-1}$. This was seen in FIGS. 16-17 for both the 72:25 and the 50:50 samples (suspensions (b) and (c)). The peak at 2350 cm$^{-1}$ is due to the absorbance of the substrate surface and should be disregarded.

X-Ray Diffraction (XRD)

Figure 18:
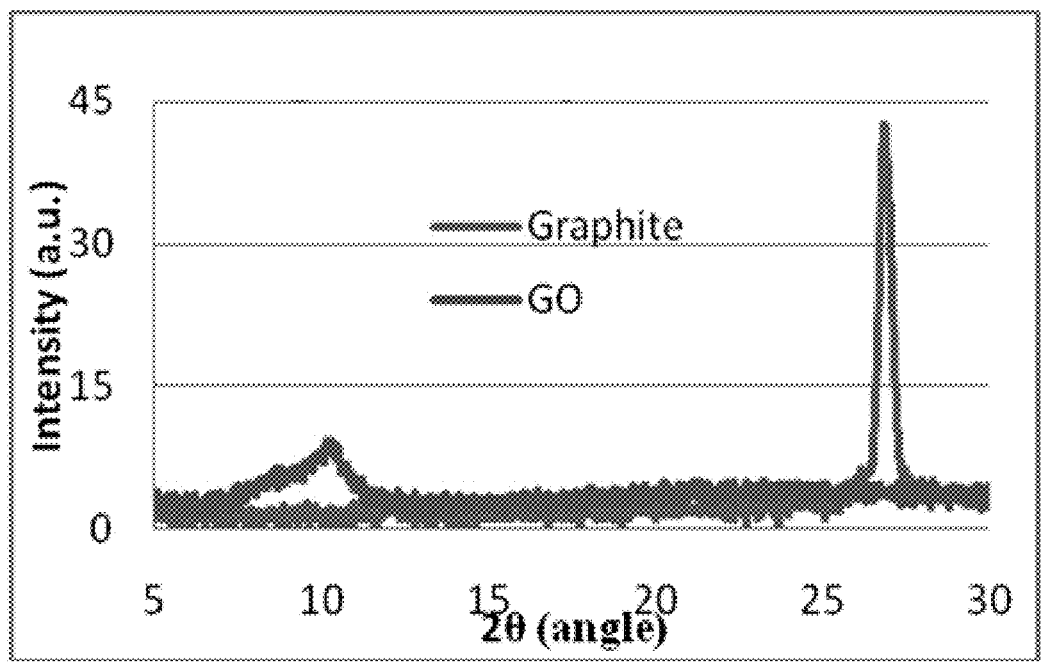
FIG. 18 is a graph of the X-Ray Diffraction results for graphite and graphene oxide.
Figure 19:
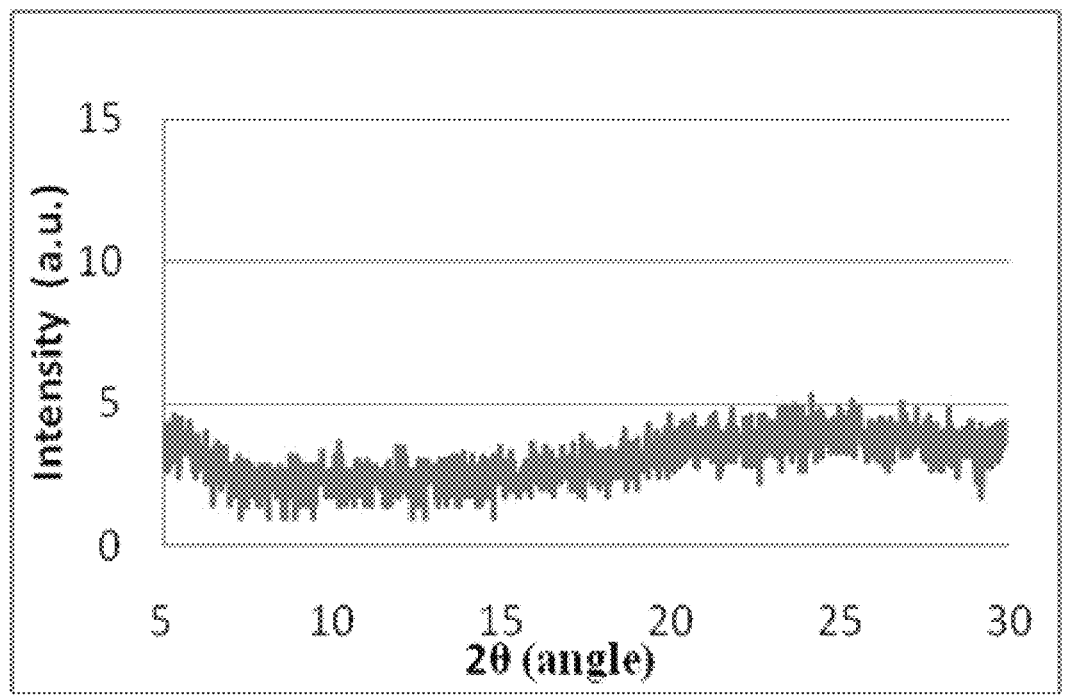
FIG. 19 is a graph of the X-Ray Diffraction results for graphene reduced in an $H_2O$ suspension.
Figure 20:
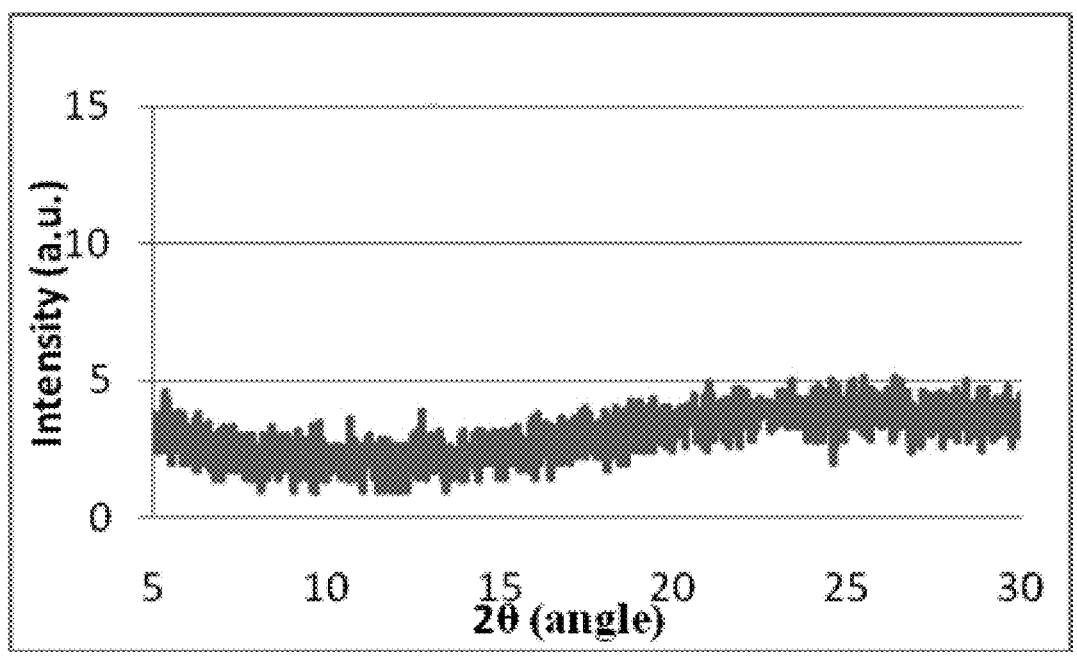
FIG. 20 is a graph of the X-Ray Diffraction results for graphene reduced in a 75:25 DI $H_2O$/ethanol suspension.
Figure 21:
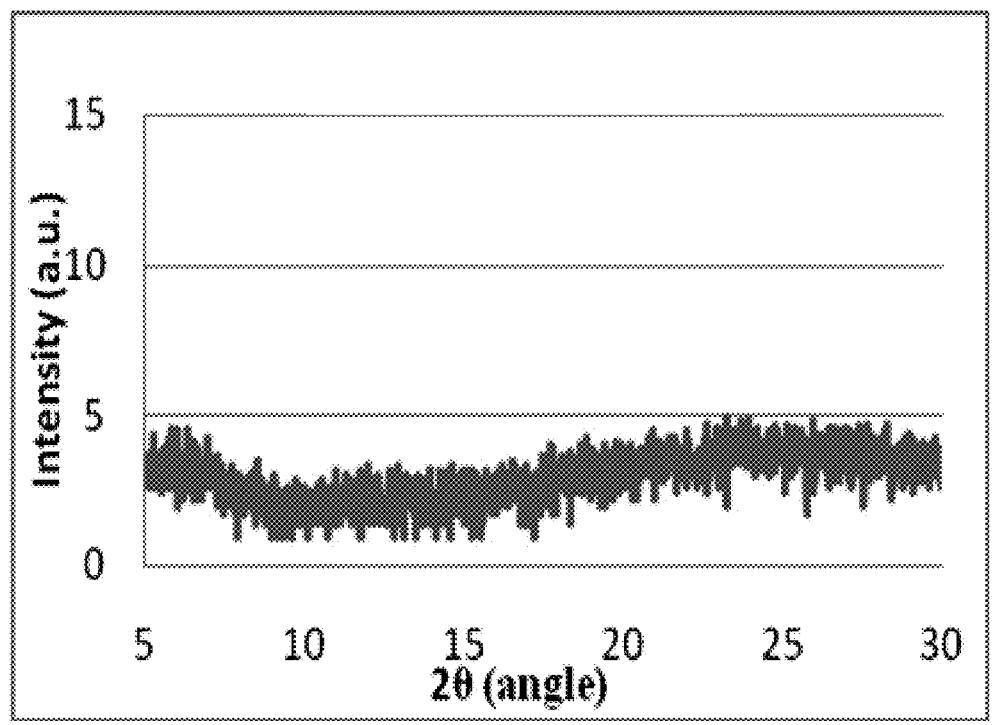
FIG. 21 is a graph of the X-Ray Diffraction results for graphene reduced in a 50:50 DI $H_2O$/ethanol suspension.
Figure 22:
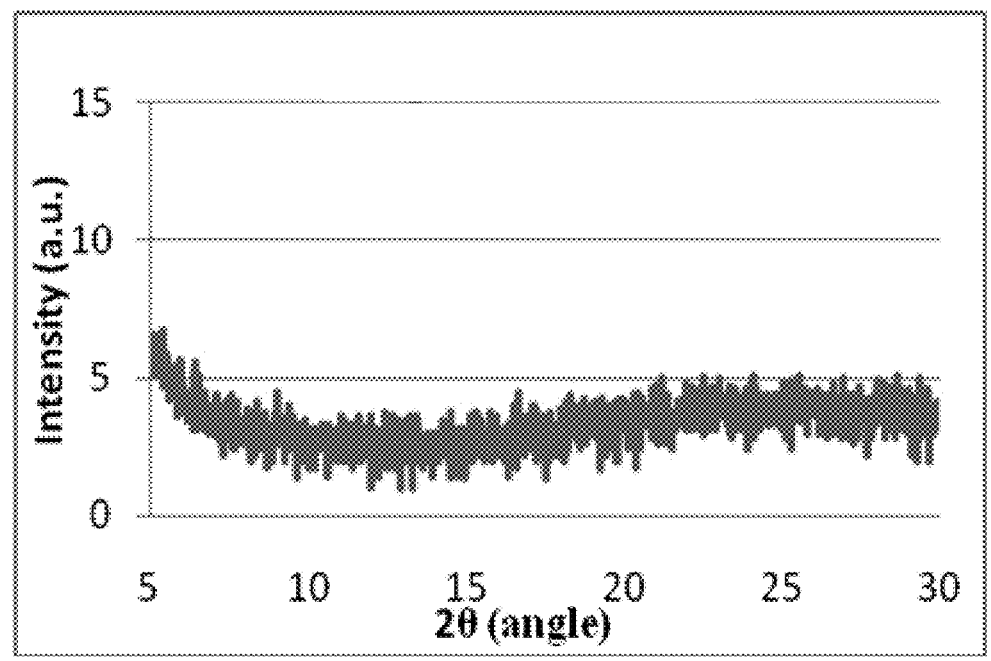
FIG. 22 is a graph of the X-Ray Diffraction results for graphene reduced in a NaOH suspension.

XRD of graphite should reveal a distinct peak at about 26° or 27°, which was present in the results (FIG. 18). According to Shin, XRD of GO should show one distinct peak at 10° or 11°, which also agreed with the results shown in FIG. 18. The 3.38 Å interlayer spacing in graphite is expanded to 8.27 Å in GO due to certain functional groups, creating these peaks. According to Shin, XRD of graphene should show one broad peak from 20° to 30° due to the removal of certain functional groups, thereby reducing the interlayer spacing. Ideally, the peak will be very broad due to the presence of many single layers and few functional groups. This peak was present in all the samples (suspensions (a)-(d)) as shown in FIGS. 19-22. However, FIG. 22 shows that the NaOH suspension, which had a broad peak, also demonstrated a functional group-related peak at 5°.

Atomic Force Microscopy (AFM)

Figure 23:
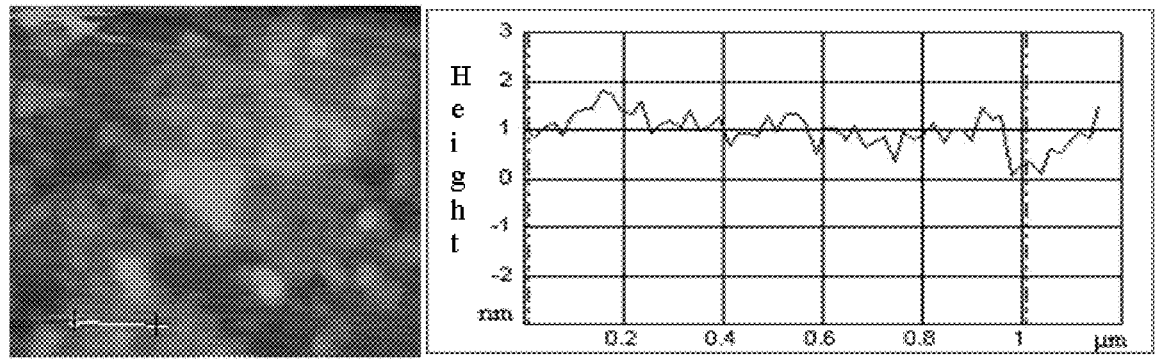
FIG. 23 shows an Atomic Force Microscopy image and a graph of the height profile of a 1 µm-long 75:25 DI $H_2O$/ethanol suspension graphene sheet.
Figure 24:
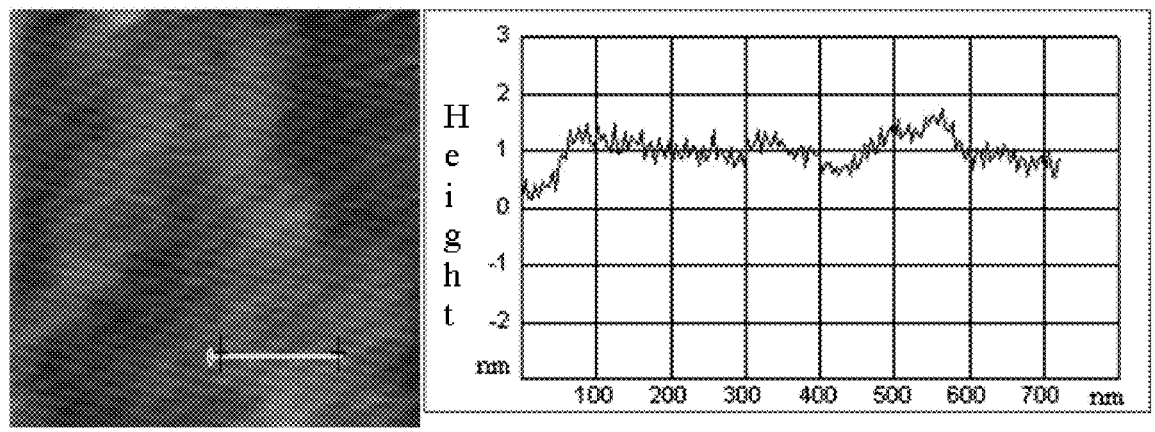
FIG. 24 shows an Atomic Force Microscopy image and a graph of the height profile of a 0.7 µm-long 75:25 DI $H_2O$/ethanol suspension graphene sheet.

According to Paredes, the height profile of a graphene layer should be between 0.7 and 1.3 nm with a sheet length of 200 nm or greater. When analyzed, not only did the graphene sheets in the 75:25 sample (suspension (b)) have heights below 1.3 nm in nearly all places, but most of them were between 600 nm and 1000 nm long. FIG. 23 shows the height profile of 1 μm-long 75:25 graphene sheet and FIG. 24 shows the height profile of 0.7 μm-long 75:25 graphene sheet.

Thermogravimetric Analysis (TGA)

Figure 25:
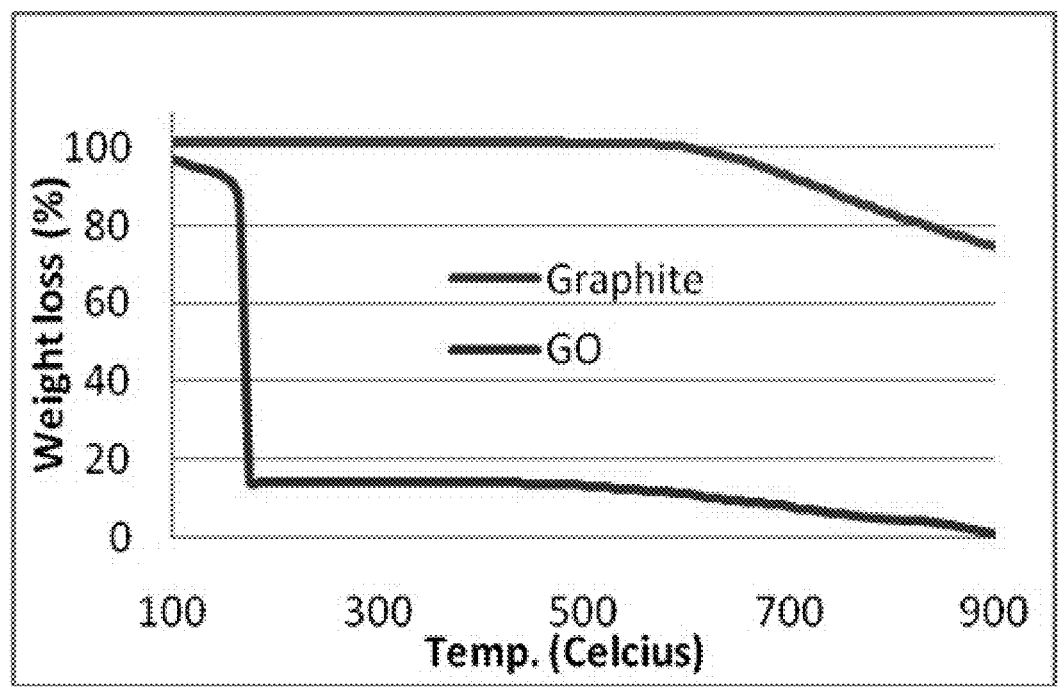
FIG. 25 is a graph showing the Thermogravimetric Analysis of graphite and graphene oxide.
Figure 26:
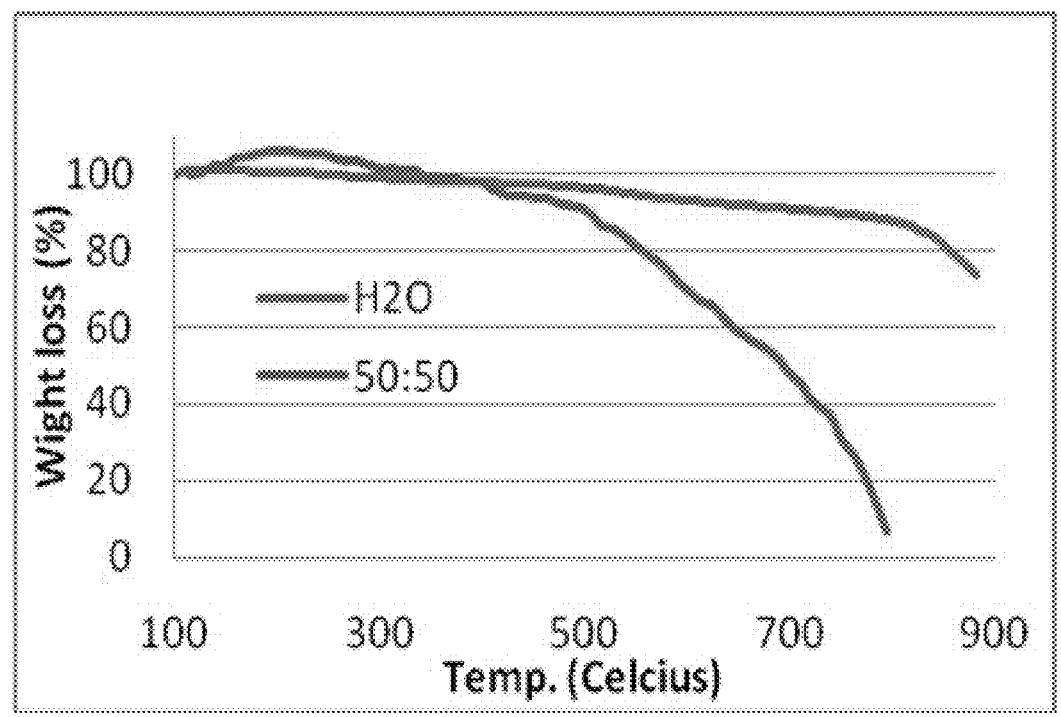
FIG. 26 is a graph showing the Thermogravimetric Analysis of graphene reduced in an $H_2O$ suspension and a 50:50 DI $H_2O$/ethanol suspension.

Ideally, graphite should show considerable weight loss at about 600° C. When tested, the graphite did in fact decompose at 610° C. as shown in FIG. 25. According to Wang, GO should show significant weight loss at both 200° C. and 500° C. FIG. 25 shows that, when GO was tested, it did indeed demonstrate weight loss at both 180° C. and 500° C. These definitive weight losses for graphite and GO are attributed to the combustion of $CO_2$ and carbon oxidation, respectively. According to Wang, the TGA for graphene should be somewhat of a steady downward curve from 0 to 800° C. because of its monatomic structure, which exhibits less thermal stability than graphite's lattice structure. This was evident in the 50:50 sample (suspension (c)), but not in the $H_2O$ sample (suspension (a)), which did not show any significant weight loss until 800° C. as shown in FIG. 26.

Transmission Electron Microscopy (TEM)

Figure 27:
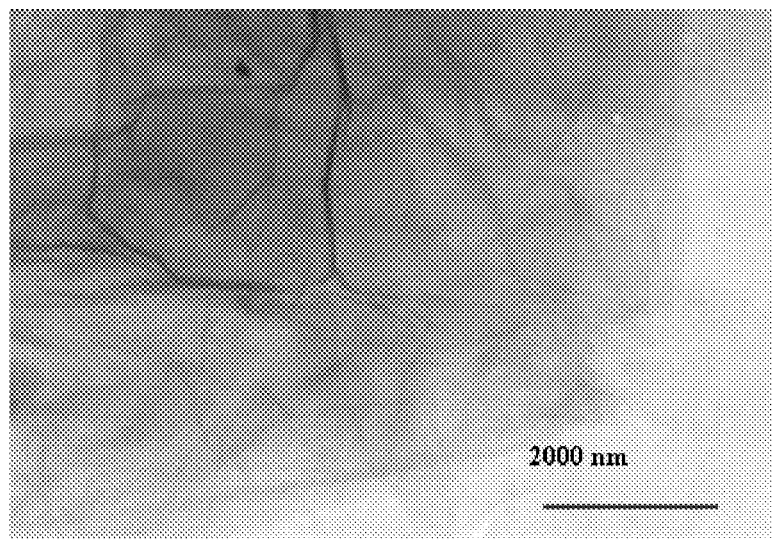
FIG. 27 is a TEM image for graphene reduced in an $H_2O$ suspension.
Figure 28:
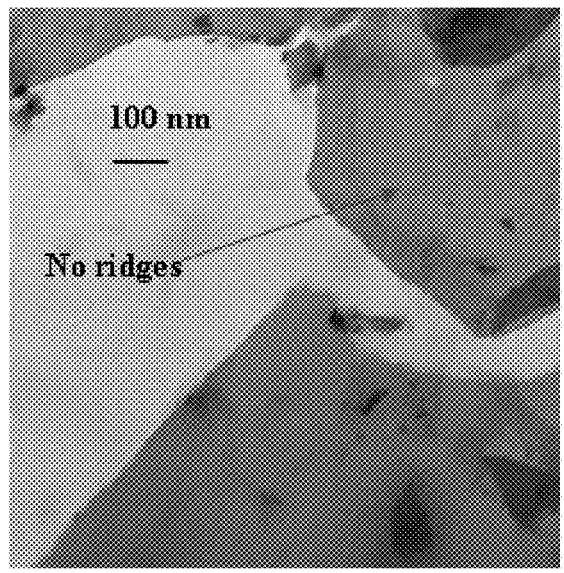
FIG. 28 is a TEM image for graphene reduced in a NaOH suspension.
Figure 29:
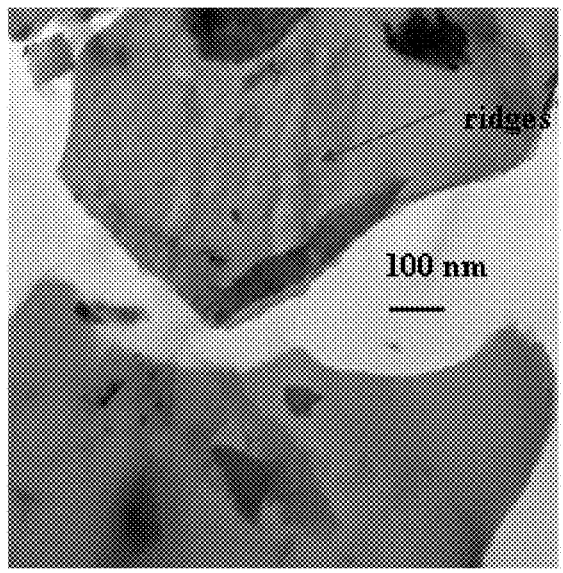
FIG. 29 is a TEM image for graphene reduced in a NaOH suspension tilted 30°.

The TEM images confirm that GO was in fact produced. FIG. 27 shows the TEM of $H_2O$ GO (suspension (a)). Ideally, GO should just be multi-layered graphene with non-visible functional groups attached. TEM of graphene should show flat, non-wrinkled sheets that when focused, can be distinguished as single layers (circles) because of their relatively light color. The TEM images obtained indicate that graphene was in fact synthesized in all four samples. First, the 2-dimensional structure had to be confirmed. By tilting the NaOH grid 30°, ridges (due to standard atmospheric wave oscillations and the Mermin-Wagner Theorem) were observed. FIG. 28 shows NaOH graphene (suspension (d)) before tilting and FIG. 29 shows NaOH graphene tilted 30°. However, in the NaOH sample, graphene was seldom seen, and only on the edges of unreduced GO sheets as shown in FIG. 30.

The images also suggest that the GO might have, in various places, been reduced back to graphite. In the $H_2O$ sample (suspension (a)), graphene sheets were present, but only on a relatively small scale of 400 nm as shown in FIG. 31. In the 50:50 sample (suspension (c)), a significant number of good quality sheets were found. Not only were they at least 1600 nm long but, as FIG. 32 shows, they were also completely single-layered and entirely rectangular with very few visible defects. In the 75:25 sample (suspension (b)), numerous high-quality graphene sheets were found. Many of the sheets were 1200 to 2100 nm long and 95% of them were single-layered. The Xs in FIG. 33 show multi-layered sheets. There was also a large amount of single-layered graphene for such a relatively small view area. Such high-quality graphene of this size and amount has never been synthesized as successfully.

Figure 34:
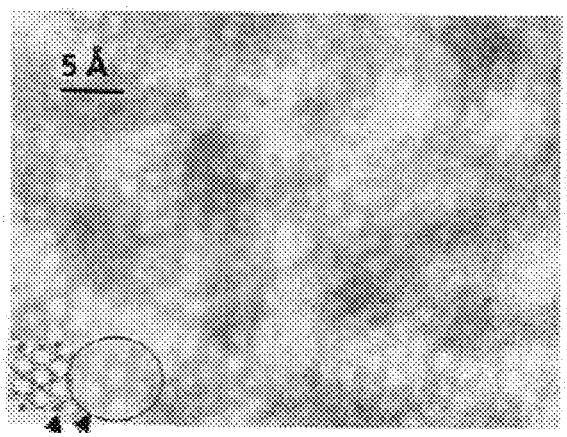
FIG. 34 is a High-Resolution Transmission Electron Microscopy ("HRTEM") image of a graphene monolayer.

HRTEM images shown in FIG. 34 confirmed both the monatomic carbon and hexagonal lattice structures of the graphene. Ideally, HRTEM images just show a network of bonded carbon atoms. More than one layer is indicated by the visibility of atoms under the lattice structure. In the image shown in FIG. 34, the background is not uniform due to the amorphous carbon film of the TEM grid.

Figure 35:
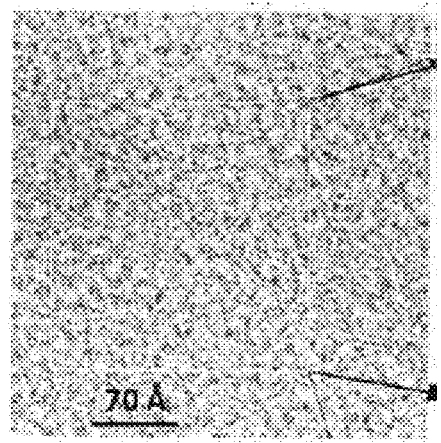
FIG. 35 is a HRTEM image of a graphene multilayer.
Figure 36:
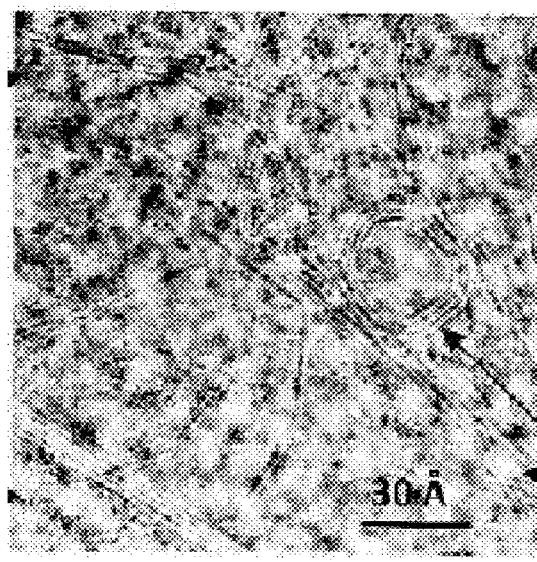
FIG. 36 is a HRTEM image of a graphene multilayer with the top layer rolled into a nanotube.
Figure 37:
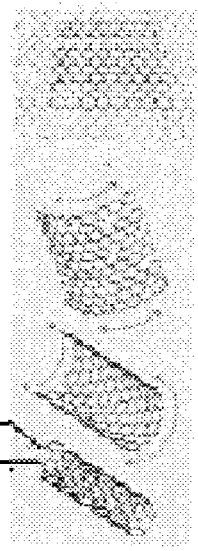
FIG. 37 is an enlarged the nanotubes shown in FIG. 36 image of FIG. 38 is an electron diffraction image of graphene.

FIGS. 35-37 show bi-layer sections of the 75:25 sample (suspension (b)) in which the top graphene sheets rolled into single-walled carbon nanotubes, while the bottom sheets remained flat and stationary. This demonstrates a well-ordered carbon lattice.

Figure 38:
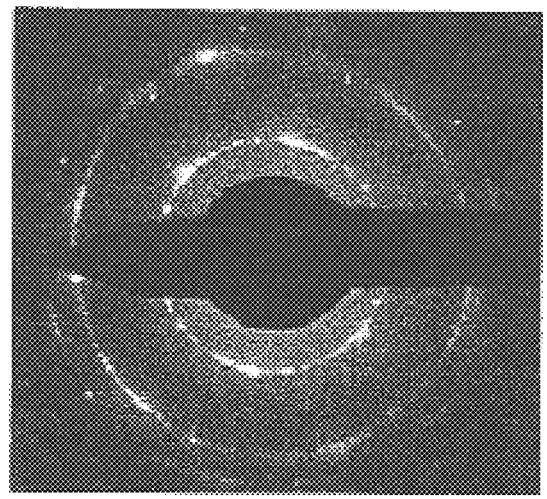

The ED pattern of graphene would typically be expected to show multiple, bright dots. Although these bright dots were observed, less apparent dots were also visible in two (inner and outer) rings as shown in FIG. 38. This confirms the six-fold symmetry of the hexagonal lattice structure and the 1.4 Å interatomic spacing. The rings also show that, in some places, a polycrystalline structure was obtained.

Pure graphene sheets of sizes greater than 1 $\mu m^2$ have been successfully synthesized using ethanol-water solvents. The gentler reduction method of adding $NaBH_4$ dropwise at room temperature to both the 50:50 $H_2O$/ethanol (suspension (c)) and the 75:25 $H_2O$/ethanol (suspension (b)) concentrations yielded non-wrinkled sheets of high quality, confirmed by experimental analysis. The majority of the sheets were greater than 1 $\mu m$ long with some sheets having lengths greater than 2 $\mu m$ and areas greater than 2 $\mu m^2$. The Raman and FTIR spectra, XRD results, AFM height profiles, TGA curves, ED, TEM, and HRTEM images are all comparable to those of graphene reported in published papers.

Figure 39:
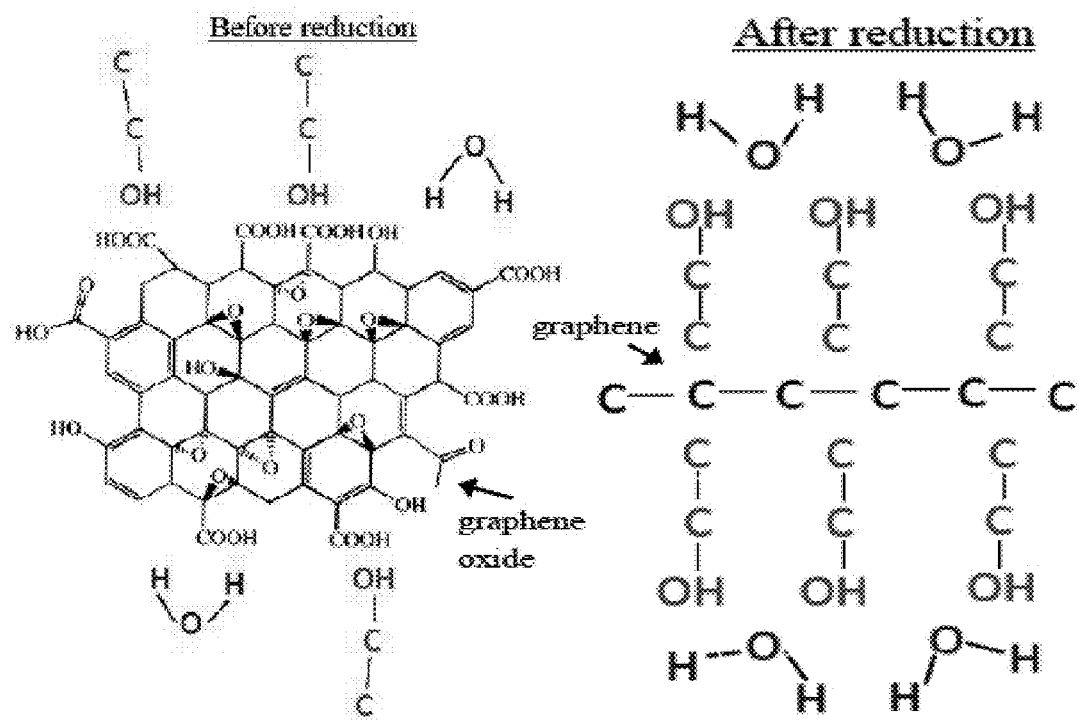
FIG. 39 is a chemical formula showing the proposed reduction mechanism for forming graphene from graphene oxide.

It was observed that during exfoliation, the ethanol's hydroxyl groups form hydrogen bonds with $H_2O$ molecules, while the C—C ends of ethanol surround the graphene during exfoliation and reduction, keeping it suspended in the solvent. FIG. 39 shows the observed reduction mechanism. However, in higher concentrations of ethanol, carbon sheets clump together, precipitating graphene. The NaOH sample (suspension (d)) failed to produce graphene and may have reduced the GO back to graphite. The graphene produced by the $H_2O$ sample (suspension (a)) exhibited a graphite-like TGA curve and unsatisfactory sheet size.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A method for preparing a graphene sheet greater than 1 $\mu m$ in length, the method comprising:
    combining graphitic oxide with a solvent comprising ethanol and deionized water to form a graphitic oxide solution;
    mixing a reductant and the graphitic oxide solution to form a mixture, wherein the reductant is $NaBH_4$, and wherein the concentration of the reductant in the mixture is from 5 mmolar to 25 mmolar; and
    heating the mixture at a temperature of from 25° C. to 90° C. for from 3 to 30 minutes.

2. The method for preparing a graphene sheet according to claim 1, wherein the volumetric ratio of deionized water to ethanol is from about 50:50 to about 80:20.

3. The method for preparing a graphene sheet according to claim 1, wherein the volumetric ratio of deionized water to ethanol is from about 65:35 to about 75:25.

4. The method for preparing a graphene sheet according to claim 1, wherein the $NaBH_4$ is mixed with deionized water to form a solution prior to mixing with the graphitic oxide solution.

5. The method for preparing a graphene sheet according to claim 4, wherein the concentration of the reductant in the mixture is from 10 mmolar to 20 mmolar.

6. The method for preparing a graphene sheet according to claim 4, wherein the concentration of the reductant in the mixture is less than 15 mmolar.

7. The method for preparing a graphene sheet according to claim 1, wherein the heating of the mixture is carried out at a temperature of from 50° C. to 85° C.

8. A method for preparing a graphene sheet greater than 1 $\mu m$ in length, the method comprising:
    combining graphitic oxide with a solvent comprising deionized water and ethanol to form a graphitic oxide solution;
    mixing a reductant and the graphitic oxide solution to form a mixture, wherein the reductant is $NaBH_4$, and wherein the concentration of the reductant in the mixture is from 10 mmolar to 20 mmolar; and
    heating the mixture at a temperature of from 50° C. to 85° C. for from 3 to 30 minutes.

9. The method for preparing a graphene sheet according to claim 8, wherein the volumetric ratio of deionized water to ethanol is from about 50:50 to about 80:20.

10. The method for preparing a graphene sheet according to claim 8, wherein the volumetric ratio of deionized water to ethanol is from about 65:35 to about 75:25.

11. The method for preparing a graphene sheet according to claim 8, wherein the $NaBH_4$ is mixed with deionized water to form a solution prior to mixing with the graphitic oxide solution.

12. The method for preparing a graphene sheet according to claim 11, wherein the concentration of the reductant in the mixture is less than 15 mmolar.

13. The method for preparing a graphene sheet according to claim 12, wherein the heating of the mixture is carried out at a temperature of from 75° C. to 85° C.

14. The method for preparing a graphene sheet according to claim 13, wherein the heating of the mixture is carried out for from 5 to 15 minutes.

15. A method for preparing a graphene sheet greater than 1 μm in length, the method comprising:
  combining graphitic oxide with a solvent comprising a first deionized water and ethanol to form a graphitic oxide solution, wherein the volumetric ratio of deionized water to ethanol is from about 50:50 to about 80:20;
  mixing a solution of $NaBH_4$ and a second deionized water and the graphitic oxide solution to form a mixture, wherein the concentration of $NaBH_4$ in the mixture is from 10 mmolar to 20 mmolar; and
  heating the mixture at a temperature of from 25° C. to 90° C. for from 3 to 30 minutes.

16. The method for preparing a graphene sheet according to claim 15, wherein the volumetric ratio of the first deionized water to ethanol is from about 65:35 to about 75:25.

17. The method for preparing a graphene sheet according to claim 16, wherein the concentration of the reductant $NaBH_4$ in the mixture is from 13 mmolar to 17 mmolar.

18. The method for preparing a graphene sheet according to claim 17, wherein the heating of the mixture is carried out at a temperature of from 75° C. to 85° C.

19. The method for preparing a graphene sheet according to claim 18, wherein the heating of the mixture is carried out for from 5 to 15 minutes.

* * * * *

UNITED STATES PATENT AND TRADEMARK OFFICE
CERTIFICATE OF CORRECTION

| | |
|---|---|
| PATENT NO. | : 8,728,578 B2 |
| APPLICATION NO. | : 13/106498 |
| DATED | : May 20, 2014 |
| INVENTOR(S) | : Rafailovich et al. |

It is certified that error appears in the above-identified patent and that said Letters Patent is hereby corrected as shown below:

IN THE SPECIFICATION:

Column 2, Line 31
  Now reads: "hexafluoropbosphate"
  Should read: -- hexafluorophosphate --

Column 2, Line 39
  Now reads: "tetrandrofuran"
  Should read: -- tetrahydrofuran --

Column 5, Line 15
  Now reads: "FIG. 37 is an enlarged the nanotubes shown in FIG. 36 image."
  Should read: -- FIG. 37 is an enlarged image of the nanotubes shown in FIG. 36. --

Signed and Sealed this
Twenty-third Day of September, 2014

Michelle K. Lee
*Deputy Director of the United States Patent and Trademark Office*